United States Patent
Bernard et al.

(10) Patent No.: US 8,674,643 B2
(45) Date of Patent: Mar. 18, 2014

(54) SERVOMOTOR WITH REMOVABLE SUBUNITS

(75) Inventors: Etienne Bernard, Paris (FR); Gilles Aubert-Maguero, Paris (FR)

(73) Assignee: Bernard Controls, Gonesse (FR)

( * ) Notice: Subject to any disclaimer, the term of this patent is extended or adjusted under 35 U.S.C. 154(b) by 431 days.

(21) Appl. No.: 13/054,944

(22) PCT Filed: Nov. 23, 2009

(86) PCT No.: PCT/FR2009/052249
§ 371 (c)(1),
(2), (4) Date: Feb. 7, 2011

(87) PCT Pub. No.: WO2010/061106
PCT Pub. Date: Jun. 3, 2010

(65) Prior Publication Data
US 2011/0121764 A1 May 26, 2011

(30) Foreign Application Priority Data
Nov. 28, 2008 (FR) ...................................... 0858089

(51) Int. Cl.
*G05B 11/01* (2006.01)
(52) U.S. Cl.
USPC .............................. 318/560; 318/486; 318/561
(58) Field of Classification Search
USPC ......... 318/560, 465, 466, 486, 139, 561, 721, 318/727; 137/46, 49, 55, 115.24, 118.07, 137/323, 286, 288, 311; 251/35, 56, 58, 59, 251/61, 61.2, 129.01; 73/1.72, 49.7, 47, 73/61.56, 862.582, 861.82, 220, 250, 265, 73/268; 192/223.4, 81 C
See application file for complete search history.

(56) References Cited

U.S. PATENT DOCUMENTS

| 4,178,208 | A | 12/1979 | Brubaker | |
| 2003/0000765 | A1* | 1/2003 | Spadafora | ...................... 180/422 |
| 2010/0006389 | A1* | 1/2010 | Braunlich et al. | ............ 192/41 S |

FOREIGN PATENT DOCUMENTS

| DE | 34 01 154 A1 | 7/1984 |
| DE | 3 9 00 866 A1 | 7/1990 |
| FR | 2 898 393 A1 | 9/2007 |
| GB | 2 137 317 A | 10/1984 |

* cited by examiner

*Primary Examiner* — Antony M Paul
(74) *Attorney, Agent, or Firm* — Leydig, Voit & Mayer, Ltd.

(57) ABSTRACT

A servomotor includes a motor unit generating movement of a mechanical component, a position-detecting unit detecting the position of the mechanical component, and a control unit manually controlling the mechanical component. The manual control unit is inside a main enclosure, the manual control unit is actuated by an actuator located outside the main enclosure, and the main enclosure is connected to the motor unit and to the position-detecting unit, The position-detecting unit and the motor unit are located inside first and second enclosures that are distinct from the main enclosure and are removably connected to the main enclosure. The manual control unit can be actuated when the first and second enclosures are separated from the main enclosure.

8 Claims, 2 Drawing Sheets

SERVOMOTOR WITH REMOVABLE SUBUNITS

FIELD OF THE INVENTION

The present invention relates to a servomotor including removable subunits. The servomotor according to the invention can advantageously be used in nuclear power plants.

BACKGROUND

A servomotor is designed to generate a precise movement of a mechanical component, for example an industrial valve, according to an external command. A servomotor is thus a motorized system capable of reaching predetermined positions, then maintaining them. The position is, in the case of a rotary servomotor, a corner position, and, in the case of a linear servomotor, a distance position. The start-up and preservation of the predetermined position are controlled by the external control.

Figure 1:
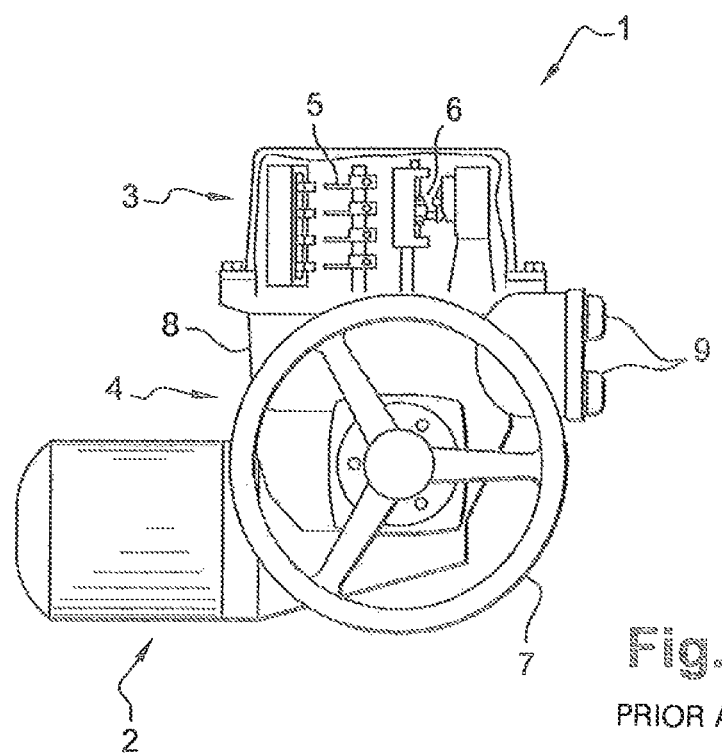

FIG. 1 diagrammatically illustrates a servomotor 1 of the prior art. The servomotor 1 traditionally comprises a motor unit 2 suitable for generating a movement of a mechanical component, a unit 3 for detecting the position of the mechanical component, and a unit 4 for manually controlling the mechanical component. The motor unit 2 and the unit 3 for detecting the position are adjacent to the manual control unit 4.

The position-detecting unit 3 of the mechanical component, for example, comprises a system 5 for detecting the end of travel, for measuring the distance traveled by the mechanical component, and indicating whether the final position of the mechanical component has been reached. The system 5 makes it possible to measure the torque applied to the mechanical component. The position-detecting unit 3 of the mechanical component can comprise a stress limiter 6 for detecting the torque applied.

The manual control unit 4 is actuated by an actuating means 7, typically a flywheel 7, making it possible to manually control the mechanical component, via a reduction gear of the manual control unit 4. The manual control can in particular be activated during commissioning of the servomotor 1 or in case of breakdown, for example in the event the electrical power of the servomotor 1 is cut.

In this type of servomotor, the manual control unit 4 is positioned inside an enclosure 8, with the exception of the flywheel 7, situated outside the enclosure 8. The enclosure 8 also includes the other components of the servomotor 1, such as the motor unit 2, the position-detecting unit 3, and the manual control unit 4. The enclosure 8 also comprises two cable inlets 9, one cable inlet 9 intended to receive an electrical power cable of the motor unit 2, making it possible to control the motor unit 2 using an external control system, and a cable inlet 9 intended to receive a data transfer cable making it possible to transfer data to the control system relative in particular to the position of the mechanical component. The cable inlets 9 are generally made using a cable gland.

During an intervention on a servomotor, it may be necessary to quickly access the different parts of the servomotor. This is in particular the case during interventions in nuclear power plants, because it is very risky and very expensive to prolong the intervention.

The servomotor illustrated in FIG. 1 does not allow a quick intervention. Indeed, placing the servomotor is a heavy operation, because it is necessary to separate the servomotor unit from the mechanical component actuated by the servomotor. Moreover, the access to the different parts of the servomotor inside the enclosure is particularly complex. Furthermore, once the servomotor is placed, it is no longer possible to use the manual control that is part of the servomotor.

The invention aims to resolve these drawbacks.

SUMMARY OF THE INVENTION

The invention proposes a servomotor making it possible to intervene quickly and effectively on the various components of the servomotor, in particular on the motor unit and the position-detecting unit, while continuing to be able to actuate the manual control of the servomotor.

The invention thus relates to a servomotor including a motor unit suitable for generating a movement of a mechanical component, a unit for detecting the position of the mechanical component, and a unit for manually controlling the mechanical component, said manual control unit being arranged inside a so-called main enclosure, said manual control unit being actuated by an actuating means located outside the main enclosure, said main enclosure also being connected to the motor unit and to the position-detecting unit.

In the servomotor according to the invention, the position-detecting unit and the motor unit are arranged inside enclosures distinct from said main enclosure and removably connected thereto, such that the manual control unit can be actuated when the enclosures, in which the position-detecting unit and the motor unit are arranged, are separated from the main enclosure.

The manual control can thus be actuated, even when the position-detecting unit is placed. This is not possible with a traditional servomotor, because the position-detecting unit is not a removable subunit.

The enclosures in which the position-detecting unit and the motor unit are positioned can be screwed on the main enclosure.

The servomotor advantageously comprises a connector, removably connected to the position-detecting unit and suitable for connecting the position-detecting unit to a data transfer cable. The position-detecting unit contains the position detector, the cabling, and the base of the connector. The placement of the position-detecting unit therefore does not require any uncabling.

The motor unit can transmit a torque to the mechanical component. In this case, the position-detecting unit advantageously comprises a system for measuring the transmitted torque.

The system for measuring the transmitted torque can comprise a stress limiter.

The position-detecting unit can comprise a coupling, typically a quick coupling, suitable for mechanically connecting the position-detecting unit to the mechanical component. Quick coupling makes it possible to quickly reassemble the position-detecting unit.

The servomotor can comprise a connector removably connected to the main enclosure and suitable for connecting an electrical power cable to a connection circuit of the main enclosure, said connection circuit being suitable for connecting to the motor unit.

The motor unit can comprise an electrical connecting unit suitable for being removably connected to the connection circuit for connecting to the main enclosure.

The invention also relates to the use of a servomotor described above in a nuclear power plant.

BRIEF DESCRIPTION OF DRAWING FIGURES

Figure 2:
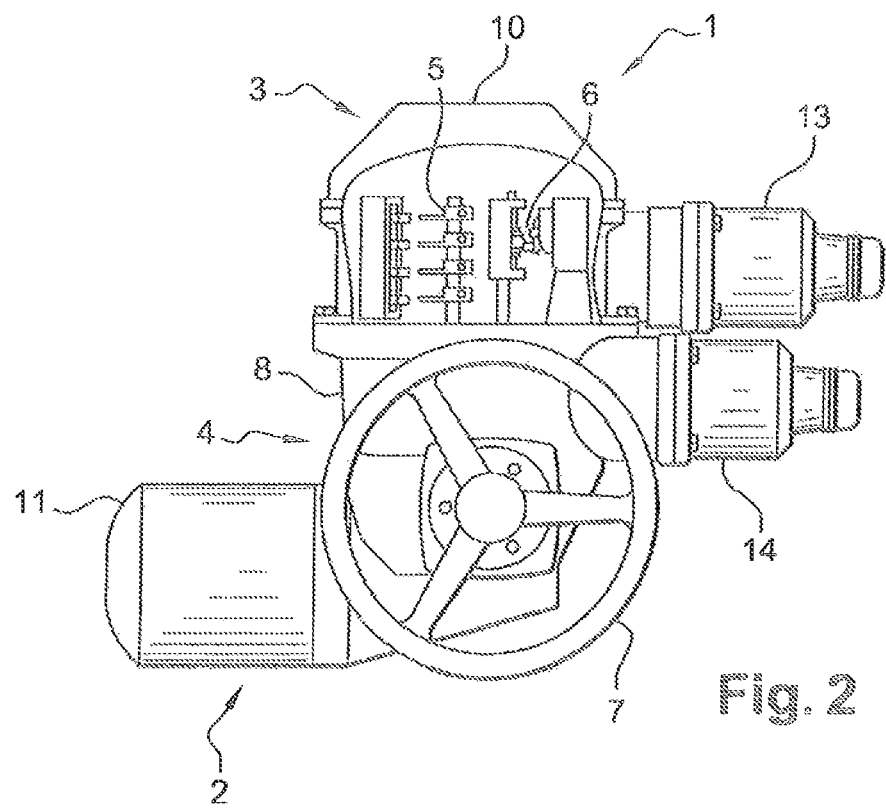
Figure 3:
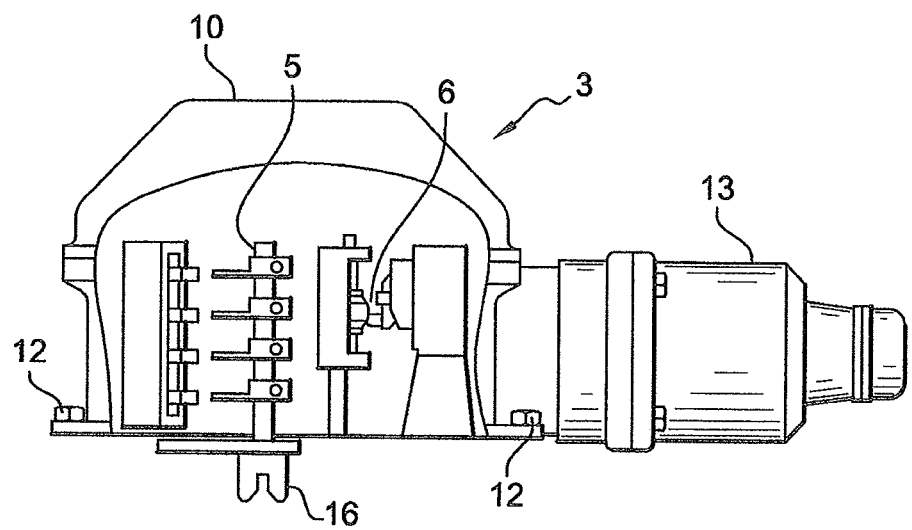
Figure 4:
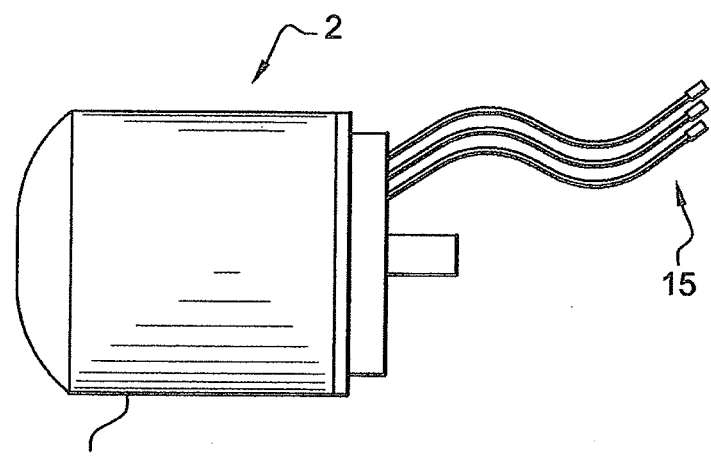

Other aims, features and advantages of the invention will appear upon reading the following description, provided only as a non-limiting example, and done in reference to the appended drawings in which:

FIG. 1, already described, diagrammatically illustrates a servomotor of the prior art, FIG. 2 diagrammatically illustrates a servomotor according to the invention, and FIGS. 3 and 4 are detailed views of sub-units of the servomotor according to the invention.

DETAILED DESCRIPTION

The servomotor 1 according to the invention, as illustrated in FIG. 2, in which the elements identical to those of FIG. 1 bear the same references, comprises a motor unit 2 suitable for generating a movement of a mechanical component, the mechanical component typically being a valve, a position-detecting unit 3 of the mechanical component, as well as a manual control unit 4 of the mechanical component positioned in a main enclosure 8. The motor unit 2 and the position-detecting unit 3 are adjacent to the manual control unit 4. The manual control unit 4 is actuated by a manual control flywheel 7 positioned outside the main enclosure 8.

According to the invention, the position-detecting unit 3 and the motor unit 2 are positioned inside separate enclosures of said main enclosure 8. The position-detecting unit 3 is thus positioned inside an enclosure 10 and the motor unit 2 is positioned inside an enclosure 11. Moreover, the enclosure 10 of the position-detecting unit 3 and the enclosure 11 of the motor unit 2 are removably connected to the main enclosure 8, for example by screwing. In this way, the manual control unit 4 can be actuated when the enclosure 10 of the position-detecting unit 3 and the enclosure 11 of the motor unit 2 are separated from the main enclosure 8.

A connector 14 is removably connected to the main enclosure 8. The connector 14 is intended to connect an electrical power cable to a connection circuit of the main enclosure 8 suitable for being connected to the motor unit 2. The electrical power cable makes it possible to transmit the control coming from the external control system to the motor unit 2, via the connection circuit positioned in the main enclosure 8.

The position-detecting unit 3, as illustrated in FIG. 3, comprises a system 5 for detecting the end of travel and a stress limiter 6. The position-detecting unit 3 is provided with fastening screws 12, accessible from the outside, and that make it possible to connect the position-detecting unit 3 to the main unit 8. To facilitate the disassembly of the servomotor 1, the position-detecting unit 3 is also removably connected, for example by screwing, to a connector 13. The connector 13 is suitable for connecting the position-detecting unit 3 to a data transfer cable intended for the external control system.

To facilitate the connection and disconnection of the position-detecting unit 3 to the main enclosure 8, the position-detecting unit 3 comprises a quick coupling 16 suitable for mechanically connecting the position-detecting unit 3 to an output shaft connected to the valve.

The placement of the position-detecting unit 3 can thus be done simply and quickly, since it is sufficient to disconnect the connector 13, then to remove the screws 12 to remove the position-detecting unit 3.

To connect the motor unit 2 to the connection circuit of the main enclosure 8, the motor unit 2 comprises an electrical connection component 15 suitable for being removably connected to the connection circuit of the main enclosure 8, as illustrated in FIG. 4. In the case of a triphase motor, the electrical connection component 15 comprises three electrical contacts that can be clipped to corresponding electrical contacts of the connection circuit of the main enclosure 8. The motor unit 2 thus has its own internal connection that makes it possible to quickly separate it from the main enclosure 8, without intervening on the connector 14.

The placement of the motor unit 2 can thus be done simply and quickly, since it is sufficient to remove the fastening screws of the motor unit 2, then remove the motor unit 2 and disconnect the electrical connection component 15.

Thus, owing to the configuration of the servomotor 1 in subunits, the placement of the position-detecting unit 3 and the motor unit 2 does not condemn the manual control of the valve.

The invention claimed is:

1. A servomotor including
a motor unit producing movement of a mechanical component;
a position-detecting unit detecting position of the mechanical component;
a manual control unit manually controlling the mechanical component;
a main enclosure in which the manual control unit is located; and
first and second enclosures distinct from the main enclosure, wherein
the first and second enclosures are independently removably mountable directly to the main enclosure at respective first and second locations on the main enclosure,
the position-detecting unit and the motor-unit are respectively located within the first and second enclosures,
the manual control unit is actuated by actuating means located outside the main enclosure,
the main enclosure is connected to the motor unit and to the position-detecting unit, and
the manual control unit can be actuated when the first and second enclosures are not mounted on the main enclosure.

2. The servomotor according to claim 1, wherein the first and second enclosures are removably mountable directly on the main enclosure with screws.

3. The servomotor according to claim 1, comprising a connector, removably connected to the position-detecting unit, for connecting the position-detecting unit to a data transfer cable.

4. The servomotor according to claim 1, wherein
the motor unit transmits torque to the mechanical component, and
the servomotor comprises means for measuring the torque transmitted.

5. The servomotor according to claim 4, wherein the means for measuring the torque transmitted comprises a stress limiter.

6. The servomotor according to claim 1, wherein the position-detecting unit comprises a quick coupling mechanically connecting the position-detecting unit to the mechanical component.

7. A servomotor comprising:
a motor unit producing movement of a mechanical component;
a position-detecting unit detecting position of the mechanical component;
a manual control unit manually controlling the mechanical component;
a main enclosure in which the manual control unit is located;
a connector removably connected to the main enclosure and connecting an electrical power cable to a connection circuit of the main enclosure, the connection circuit being connected to the motor unit: and first and second enclosures distinct from and removably connectable to the main enclosure, and in which the position-detecting unit and the motor unit are respectively located, wherein the manual control unit is actuated by actuating means located outside the main enclosure, the main enclosure is connected to the motor unit and to the position-detecting unit, and the manual control unit can be actuated when the first and second enclosures are separated from the main enclosure.

8. The servomotor according to claim 7, wherein the motor unit comprises an electrical connecting unit removably connected to the connection circuit of the main enclosure.

* * * * *